July 20, 1954  H. V. ELLIOTT  2,684,098
LOCK WASHER
Filed Nov. 5, 1949

INVENTOR
Harold V. Elliott
by
Spencer Hardman & Fehr
his ATTORNEYS

Patented July 20, 1954

2,684,098

UNITED STATES PATENT OFFICE 2,684,098

LOCK WASHER

Harold V. Elliott, Anderson, Ind., assignor to General Motors Corporation, Detroit, Mich., a corporation of Delaware Application November 5, 1949, Serial No. 125,743

1 Claim. (Cl. 151—35)

This invention relates to lock washers and its object is to provide a lock washer which is useful especially in conjunction with the assembling of parts with a threaded stud which extends downwardly from a fixed support These parts include a member to be clamped against the fixed support by a nut engaging the threaded stud and which is screwed toward the support to engage the lock washer which engages the member to clamp it against the support Since it is desirable that the lock washer should not turn relative to the support while the nut is loose on the screw for reasons to be stated later, the lock washer is provided with means cooperating with the support to retain the lock washer in assembly with the support.

Further objects and advantages of the present invention will be apparent from the following description, reference being had to the accompanying drawing, wherein a preferred embodiment of the present invention is clearly shown.

In the drawing:

Fig. 1 is a longitudinal, sectional view of an assembly of parts including the support, stud, member, lock washer and nut referred to.

Figure 1:
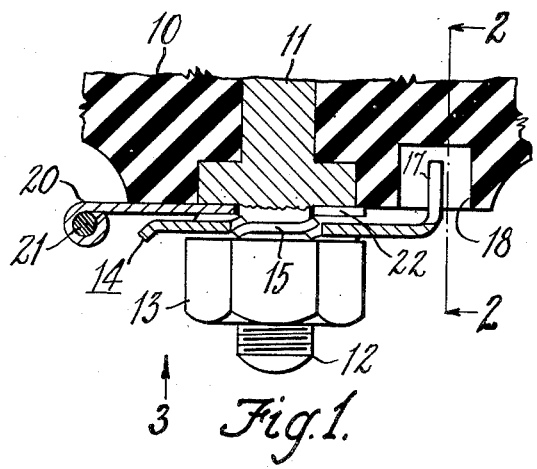
Figure 2:
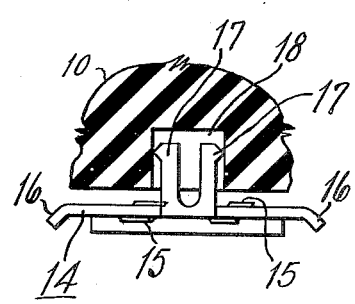
Fig. 2 is a sectional view on line 2—2 of Fig. 1.
Figure 3:
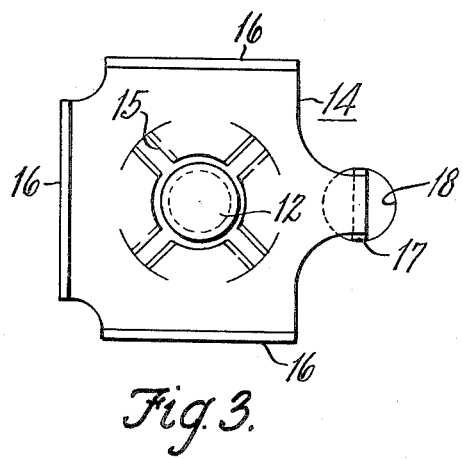
Fig. 3 is a view in the direction of arrow 3 of Fig. 1.

In Fig. 1, 10 is a fixed support which may be, for example, the cover of an ignition coil mounted upside down on the back wall of the engine compartment of an automobile. The automobile, being assembled on an assembly line, arrives at certain places where a workman is to connect with the coil terminal 11, a conductor 21 attached to a terminal clip 20. The support 10 arrives in front of the workman with a nut 13 and a lock washer 14 loosely assembled on the threaded stud 12 integral with terminal 11 and extending downwardly therefrom. The nut 13 is loose on the stud 12 so that the workman can insert the clip 20 between the lock washer 14 and the support 10 and terminal 11, the clip 20 having a notch 22 to receive the stud 12.

The lock washer 14 has three flanges 16, each one of which is shaped to assist in guiding the clip 20 between the lock washer and the support. The instructions to the workman call for assembling the clip 20 in a certain location relative to a particular flange 16, for example, the middle flange. It is therefore desirable that the lock washer, which had been previously assembled relative to the support 10 in a definite relation, should remain in that relation when the loose assembly arrives in front of the workman although the nut 13 may have become loose. Therefore the lock washer 14 has a pair of resilient, pointed tangs 17 which are received in a pocket 18 in support 10 and which, by their resiliency, bias the points of the tangs against the cylindrical surface defining the pocket 18 These tangs resiliently retain the lock washer 14, although the nut 13 were loose on the stud 12 or were removed therefrom.

All the workman is required to do is locate the clip 20 in a certain relation to one of the flanges 16 of the lock washer and insert it between the lock washer and the support and tighten the nut 13.

While the embodiment of the present invention as herein disclosed, constitutes a preferred form, it is to be understood that other forms might be adopted

What is claimed is as follows:

A locking device for use with a member having a threaded stud and nut therefor to which a bifurcated connection is to be made and wherein the member includes a pocket to position the device, comprising a rectangular plate having three flanges inclined in one direction and separated at the corners, and a lug extending from the fourth edge and bent in the opposite direction from the flanges to engage said pocket; spring locking means arranged about a central aperture to fit loosely over the stud, said locking means comprising alternate depressed lips cut into said plate on the diagonal thereof, said lug including two barbed arms forcibly insertable in said pocket for fixedly holding the device to the member, and for preventing rotation of the plate with respect to said member whereby the bifurcated connection may be slipped over the stud through an entry provided by any one of the inclined flanges, whereupon the nut may be tightened to hold the connection in place without rotating the device over the connection, so as to prevent destruction of said connection.

References Cited in the file of this patent

UNITED STATES PATENTS

| Number | Name | Date |
|---|---|---|
| 324,410 | Otto | Aug. 18, 1885 |
| 1,150,745 | Crozier | Aug. 17, 1915 |
| 1,592,020 | Weston | July 13, 1926 |
| 1,686,216 | Kyle | Oct. 2, 1928 |
| 1,916,526 | Olson | July 4, 1933 |
| 2,128,429 | Olson | Aug. 30, 1938 |
| 2,392,714 | Zerbe | Jan. 8, 1946 |